US008966038B2

(12) United States Patent
Takemura

(10) Patent No.: US 8,966,038 B2
(45) Date of Patent: Feb. 24, 2015

(54) VIRTUAL SERVER SYSTEM AND PHYSICAL SERVER SELECTION METHOD

(75) Inventor: Toshinori Takemura, Tokyo (JP)

(73) Assignee: NEC Corporation, Tokyo (JP)

( * ) Notice: Subject to any disclaimer, the term of this patent is extended or adjusted under 35 U.S.C. 154(b) by 632 days.

(21) Appl. No.: 13/061,440

(22) PCT Filed: Jun. 25, 2009

(86) PCT No.: PCT/JP2009/061602
§ 371 (c)(1),
(2), (4) Date: Feb. 28, 2011

(87) PCT Pub. No.: WO2010/024027
PCT Pub. Date: Mar. 4, 2010

(65) Prior Publication Data
US 2011/0161483 A1 Jun. 30, 2011

(30) Foreign Application Priority Data

Aug. 28, 2008 (JP) ................................. 2008-219871

(51) Int. Cl.
  *G06F 15/173* (2006.01)
  *G06F 9/50* (2006.01)
(52) U.S. Cl.
  CPC .................................... *G06F 9/5088* (2013.01)
  USPC ............................ 709/223; 709/224; 709/225
(58) Field of Classification Search
  CPC .............. G06F 9/5077; G06F 9/45558; G06F 2201/815; G06F 9/50; G06F 2009/4557
  USPC .................................................. 709/223–225
  See application file for complete search history.

(56) References Cited

U.S. PATENT DOCUMENTS

| 7,143,170 | B2 * | 11/2006 | Swildens et al. | 709/226 |
| 7,587,492 | B2 * | 9/2009 | Dyck et al. | 709/226 |
| 7,640,023 | B2 * | 12/2009 | Ma et al. | 455/453 |
| 7,774,630 | B2 | 8/2010 | Hatasaki et al. | |
| 7,783,909 | B2 | 8/2010 | Hatasaki et al. | |
| 7,941,510 | B1 * | 5/2011 | Tormasov et al. | 709/220 |
| 2006/0004909 | A1 * | 1/2006 | Takuwa et al. | 709/203 |
| 2006/0069761 | A1 * | 3/2006 | Singh et al. | 709/222 |

(Continued)

FOREIGN PATENT DOCUMENTS

| JP | 2000-167610 | 6/2000 |
| JP | 2002-259409 | 9/2002 |
| JP | 2006-154991 | 6/2006 |
| JP | 2007-272263 | 10/2007 |
| JP | 2007-310791 | 11/2007 |
| JP | 2007-323244 | 12/2007 |
| JP | WO 2008/062864 | 5/2008 |
| JP | 2008-140240 | 6/2008 |

OTHER PUBLICATIONS

Takemura et al., Information Processing Society of Japan, Technical Report, "A method for optimal allocation of virtual machines for saving energy and its evaluation"., Jan. 31, 2008.
International Search Report, PCT/JP2009/061602, Oct. 6, 2009.
JP Office Action dated Aug. 19, 2014, with English translation; Application No. 2010-526609.

*Primary Examiner* — Duyen Doan
(74) *Attorney, Agent, or Firm* — Young & Thompson

(57) ABSTRACT

Physical servers in which a plurality of servers can operate are classified into groups in accordance with a predetermined index, such as loads and amounts of free resources of the physical servers. A predetermined number of representative servers are selected in each group, a physical server as a destination of a target virtual server is determined from among the representative servers of each group, and the target virtual server is moved to the determined physical server as the destination.

20 Claims, 7 Drawing Sheets

(56) References Cited

U.S. PATENT DOCUMENTS

| | | |
|---|---|---|
| 2006/0114819 A1 | 6/2006 | Shimizu |
| 2007/0192769 A1* | 8/2007 | Mimura et al. ............... 719/316 |
| 2007/0204266 A1* | 8/2007 | Beaty et al. ....................... 718/1 |
| 2007/0233838 A1* | 10/2007 | Takamoto et al. ............. 709/223 |
| 2007/0271560 A1* | 11/2007 | Wahlert et al. .................... 718/1 |
| 2007/0283009 A1* | 12/2007 | Takemura ..................... 709/224 |
| 2008/0256607 A1* | 10/2008 | Janedittakarn et al. ........... 726/4 |
| 2010/0281286 A1 | 11/2010 | Hatasaki et al. |

* cited by examiner

VIRTUAL SERVER SYSTEM AND PHYSICAL SERVER SELECTION METHOD

TECHNICAL FIELD

The present invention relates to a virtual server system capable of simultaneously operating virtual servers on physical servers and a method of selecting a physical server as a destination of a virtual server.

BACKGROUND ART

In recent years, a server virtualization technology has been implemented, in which virtual servers are established on one physical server by software, and in which the virtual servers simultaneously execute processes. If the server virtualization technology is used, a system, in which the virtual servers simultaneously operate on physical servers connected by a communication network, can be established.

The virtual server system, in which the virtual servers operate on the physical servers, is used in a large-scale computing environment, such as in the information system of a data center or a company.

In the information system and the like of a data center or a company using the virtual server system, the installation space, power consumption, and the like tend to increase because the size of the information system increases. Therefore, a significant reduction in the power consumption is required to reduce the cost for maintaining and managing the system and to reduce $CO_2$ which is a global warming factor.

For example, Non Patent Literature 1 describes a technique, in which a management server that manages a virtual server system acquires load data of physical servers and virtual servers, moves the virtual servers to other physical servers to aggregate free resources dispersed over the physical servers, and turns off the power of excess physical servers to reduce the power consumption of the entire virtual server system.

However, in the virtual server system described in Non Patent Literature 1, there is a problem in which the processing time required to determine optimal destinations significantly increases if there are a multiplicity of physical servers that act as possible destinations for the movement of the virtual servers to other physical servers. Therefore, resource insufficiency and unnecessary free resources are generated because the time at which the virtual servers are to be moved is delayed, and the operation efficiency of the virtual server system is reduced.

CITATION LIST

Non Patent Literature

Non Patent Literature 1: Information Processing Society of Japan, Technical Report, "A method for optimal allocation of virtual machines for saving energy and its evaluation", 2008-OS-107, pp. 73-78.

SUMMARY

Therefore, an object of the present invention is to provide a virtual server system and a method of selecting a physical server that can determine an optimal physical server that acts as the destination of a virtual server and such that the virtual server can move to the destination physical server in a shorter time even if there is a multiplicity of physical servers.

In order to achieve the above-described object, a virtual server system of an exemplary aspect of the present invention comprises:

a plurality of physical servers in which a plurality of virtual servers can be operated; and an autonomous control server that classifies the physical servers into a plurality of groups based on a predetermined index, selects a predetermined number of physical servers as representative servers in each group, determines a physical server as a destination of a target virtual server from among the representative servers of each group, and moves the target virtual server to the determined physical server as the destination.

Furthermore, the exemplary aspect of the present invention provides an autonomous control server comprising:

a list generator that classifies a plurality of physical servers in which a plurality of virtual servers can operate in a plurality of groups based on a predetermined index, selects a predetermined number of physical servers as representative servers in each group, and generates a possible destination list that includes the representative servers of each group and that indicates the physical servers as possible destinations of a target virtual server;

a destination determination unit that determines a physical server as a destination of the virtual server from the possible destination list; and a virtual server movement unit that moves the target virtual server to the physical server as the destination determined by the destination determination unit.

Meanwhile, the exemplary aspect of the present invention provides a physical server selection method for selecting a physical server as a destination of a required virtual server among a plurality of physical servers in which a plurality of virtual servers can operate, wherein a computer is configured to:

classify the physical servers into a plurality of groups based on a predetermined index;

select a predetermined number of physical servers as representative servers in each group;

determine a physical server as a destination of a target virtual server from among the representative servers of each group; and move the target virtual server to the determined physical server as the destination.

EXEMPLARY EMBODIMENT

Next, the present invention will be described with reference to the drawings.

Figure 1:
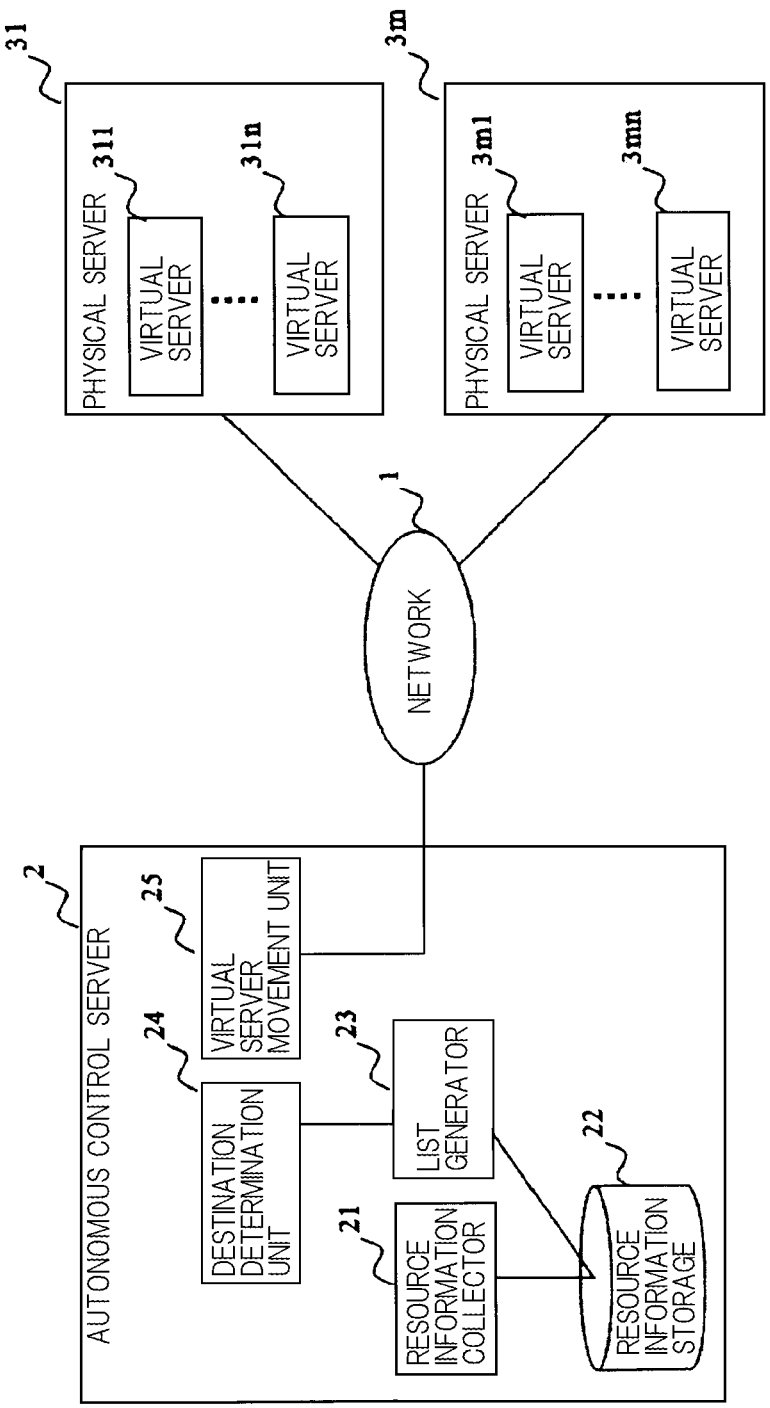
FIG. 1 is a block diagram showing an example of a configuration of a virtual server system of the present invention.
Figure 2:
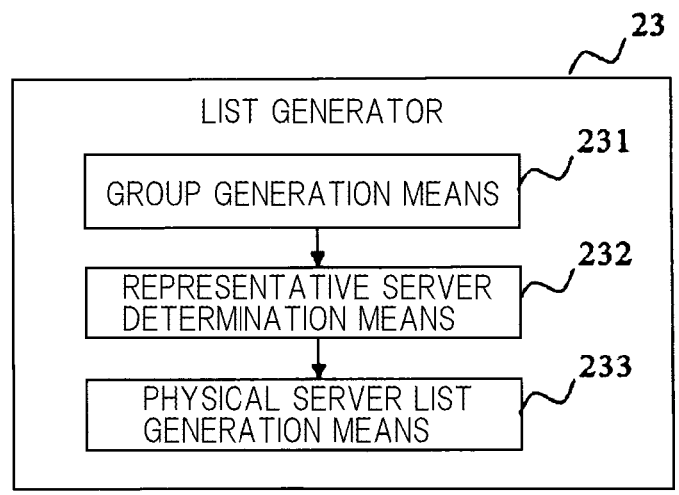
FIG. 2 is a block diagram showing a configuration of a list generator included in an autonomous control server shown in FIG. 1.

FIG. 1 is a block diagram showing an example of a configuration of a virtual server system of the present invention, and FIG. 2 is a block diagram showing an example of configuration of a list generator included in an autonomous control server shown in FIG. 1.

As shown in FIG. 1, a virtual server system of the present invention comprises physical servers 31 to 3m (m is a positive integer) and autonomous control server 2 that manages virtual servers that operate in physical servers 31 to 3m. Autonomous control server 2 and physical servers 31 to 3m are connected through communication network 1. In FIG. 1, reference numerals 311 to 31n are provided to virtual servers that operate in physical server 31, and reference numerals 3m1 to 3mn are provided to virtual servers that operate in physical server 3m (n is a positive integer).

Physical servers 31 to 3m and autonomous control server 2 comprise a known computer that executes processes according to programs stored in, for example, a recording medium (such as a magnetic disk, a semiconductor memory, and an optical disk).

Autonomous control server 2 comprises resource information collector 21, resource information storage 22, list generator 23, destination determination unit 24, and virtual server movement unit 25.

Resource information collector 21 collects resource information, such as loads (CPU utilizations, memory utilizations, and the like), input/output performance values of recording media (for example, ratio of input/output transfer speed to maximum data transfer speed), and input/output performance values of communication control apparatuses (transfer speeds, used bands, and the like), from physical servers 31 to 3m and virtual servers 311 to 3mn.

Resource information storage 22 holds resource information of physical servers 31 to 3m collected by resource information collector 21. The resource information of physical servers includes information, such as loads of physical servers 31 to 3m (utilizations of CPUs, memories, network I/Os, hard disk I/Os, and the like) collected at every certain time interval, maximum processing performances of physical servers 31 to 3m collected by preliminary measurement or by other methods (for example, measured in a process by benchmark software), and storage locations of physical servers 31 to 3m.

As shown in FIG. 2, list generator 23 comprises group generation means 231, representative server determination means 232, and physical server list generation means 233.

Group generation means 231 acquires resource information of physical servers 31 to 3m from resource information storage 22 and uses the resource information to classify physical servers 31 to 3m into groups in accordance with a predetermined index. An example of a method of grouping includes a method of using one of the values of the loads (utilizations of CPUs, memories, network I/Os, hard disk I/Os, and the like) of physical servers 31 to 3m to classify the physical servers based on predetermined ranges of the values.

Another example of a method of grouping includes a method of setting reference values to the utilizations of resources (such as CPUs, memories, network I/Os, and hard disk I/Os), normalizing the utilizations of the resources of the physical servers based on the reference values, further calculating average values of the values, and classifying the physical servers based on predetermined ranges of the average values. The method of grouping is not limited to the methods, and any method may be used as long as the physical servers can be classified into groups based on an appropriately set index. However, no matter which physical server of group is selected as the destination of a virtual server, the influence on the load balance of all physical servers needs to be small.

Representative server determination means 232 selects a predetermined number of physical servers as representative servers in each group. The number of selected representative servers in an arbitrary group may be 0.

Physical server list generation means 233 generates a list of physical servers (possible destination list) including the representative servers of each group.

Destination determination unit 24 sets the physical servers included in the possible destination list generated by list generator 23 as possible destinations of a virtual server to determine the destination of the virtual server. The destination of the virtual server can be determined using a method described, for example, in paragraphs 4.2 and 4.3 of Non Patent Literature 1. The method of determining the destination of the virtual server is not limited to the method described in Non Patent Literature 1, and any method may be used if the optimal physical server as the destination of the virtual server can be determined from the possible destinations.

Virtual server movement unit 25 moves the target virtual server to the physical server as the destination selected by destination determination unit 24.

In the virtual server system of the exemplary embodiment, when a virtual server is moved to another physical server, group generation means 231 included in list generator 23 of autonomous control server 2 acquires the resource information of physical servers 31 to 3m from resource information storage 22 and classifies physical servers 31 to 3m into groups based on the resource information in accordance with a predetermined index. Representative server determination means 232 of list generator 23 selects a predetermined number of physical servers as representative servers in each group, sets the representative servers of each group as possible destinations, and determines the destination of the target virtual server.

As described in Non Patent Literature 1, when free resources dispersed over the physical servers are aggregated in the virtual server system, the destination of the virtual server is determined by calculating evaluation values in consideration of not only the utilizations of the CPUs, but also the used amounts of memories, utilizations (throughputs) of network I/Os and hard disk I/Os, and the like and are determined based on the calculated evaluation values. Therefore, even if physical servers 31 to 3m are classified into groups based on predetermined ranges of loads or amounts of free resources, a physical server in a group with the maximum load or a physical server in a group with the minimum amount of free resources may not be the optimal destination of the virtual server.

Therefore, in the virtual server system of the exemplary embodiment, a multiplicity of physical servers are classified into groups in accordance with a predetermined index, and then representative servers selected from each group based on the same index as in the grouping or based on a different index are set as possible destinations of a virtual server. Even if the destinations of the virtual server is determined from among the representative servers of each group, there is almost no degradation in the operation efficiency of the virtual server system after the movement of the virtual server compared to the process of determining the destination of the virtual server from all physical servers excluding the origin of the virtual server.

According to the present invention, physical servers are classified into groups based on an index, such as loads of the physical servers, and a predetermined number of representative servers are selected as possible destinations in each group. As a result, the number of physical servers as the possible destinations of the virtual server can be reduced, and the processing time required to determine a physical server as the destination of a virtual server can be reduced.

First Exemplary Embodiment

Next, the virtual server system of a first exemplary embodiment will be described using the drawings.

The virtual server system of the first exemplary embodiment is an example of reducing the number of possible destinations by generating a possible destination list of the destination of a virtual server based on load information of the physical servers.

Figure 3:
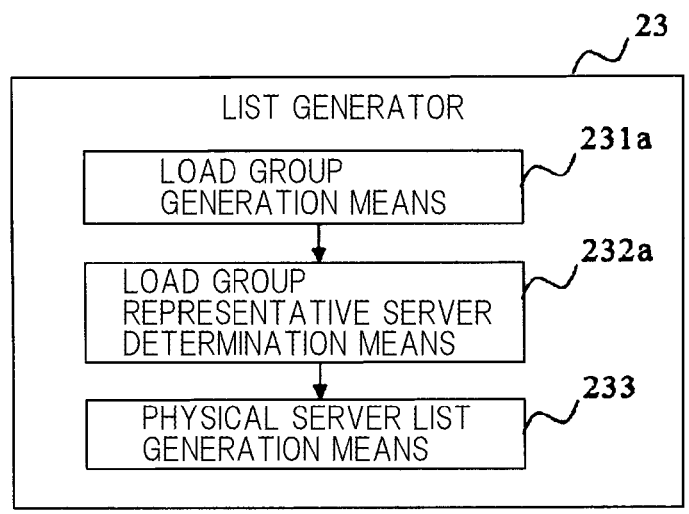
FIG. 3 is a block diagram showing a configuration of the list generator included in the autonomous control server of a first exemplary embodiment.
Figure 4:
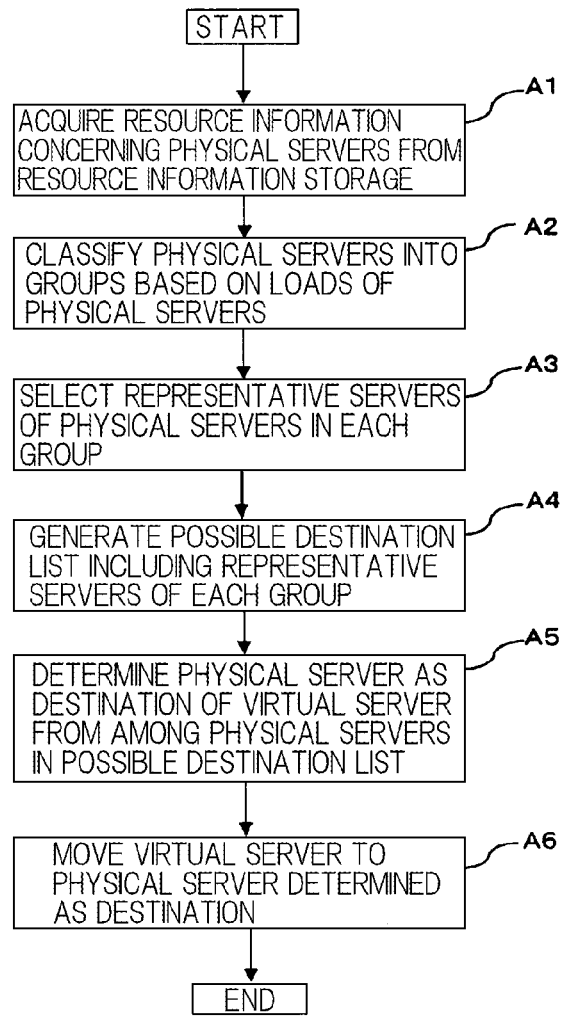
FIG. 4 is a flow chart showing a processing procedure of the autonomous control server included in the virtual server system of the first exemplary embodiment.

FIG. 3 is a block diagram showing a configuration of a list generator included in the autonomous control server of the first exemplary embodiment. FIG. 4 is a flow chart showing a processing procedure of the autonomous control server included in the virtual server system of the first exemplary embodiment.

The configuration of the virtual server system is the same as the configuration shown in FIG. 1. In autonomous control server 2, it is assumed that resource information collector 21 has acquired information of loads (utilizations of CPUs, memories, network I/Os, hard disk I/Os, and the like) of physical servers 31 to 3m and virtual servers 311 to 3mn as resource information. It is assumed that the target virtual server is virtual server 311 operated on physical server 31 shown in FIG. 1.

As shown in FIG. 3, list generator 23 of the first exemplary embodiment comprises load group generation means 231a, load group representative server determination means 232a, and physical server list generation means 233.

Load group generation means 231a acquires information of loads (utilizations of CPUs, memories, network I/Os, hard disk I/Os, and the like) of physical servers 31 to 3m from resource information storage 22 and classifies physical servers 31 to 3m into groups based on the information of the loads.

Load representative server determination means 232a selects a predetermined number of physical servers as representative servers in each group generated by load group generation means 231a.

Physical server list generation means 233 generates a list of physical servers (possible destination list) including the representative servers of each group selected by load representative server determination means 232a.

As shown in FIG. 4, in autonomous control server 2, load group generation means 231a of list generator 23 first acquires information of the loads of physical servers 31 to 3m from resource information storage 22 (step A1).

Load group generation means 231a classifies physical servers 31 to 3m into groups based on the loads (step A2). At this point, physical server 31 as the origin of target virtual server 311 is excluded from the elements for the classification into groups. Load group generation means 231a may use the utilizations of individual resources of CPUs, memories, and the like to classify physical servers 32 to 3m into groups or may use values calculated based on the utilizations of the resources to classify physical servers 32 to 3m into groups. Furthermore, load group generation means 231a may classify physical servers 32 to 3m into groups based on predetermined ranges of utilizations of resources, and other methods may be used to classify physical servers 32 to 3m into groups.

Next, in autonomous control server 2, load group representative server determination means 232a selects a predetermined number of physical servers as representative servers in each group. For example, load group representative server determination means 232a sorts the physical servers in a group in ascending order of loads (ascending order of utilizations of resources) and determines the top three physical servers that have fewer loads as representative servers. Alternatively, load group representative server determination means 232a randomly selects physical servers (for example, two physical servers) from a group without sorting the physical servers and selects the physical servers as the representative servers. Load group representative server determination means 232a may determine the representative servers of each group by other methods. At this point, the number of representative servers may be 0 as a result of the selection process (step A3).

Next, in autonomous control server 2, physical server list generation means 233 generates a possible destination list including the representative servers of each group (step A4).

Subsequently, in autonomous control server 2, destination determination unit 24 determines a physical server (for example, physical server 3m) as the destination of target virtual server 311 among the physical servers as the possible destinations included in the possible destination list (step A5). The physical server as the destination of virtual server 311 can be determined using, for example, the method described in Non Patent Literature 1 (paragraphs 4.2 and 4.3) as described above.

Lastly, in autonomous control server 2, virtual server movement unit 25 moves target virtual server 311 to physical server 3m as the destination determined in step A5 by destination determination unit 24 (step A6).

According to the virtual server system of the exemplary embodiment, the number of physical servers as possible destinations of a virtual server can be reduced by classifying the physical servers into groups based on the loads and by selecting a predetermined number of representative servers as possible destinations in each group. Therefore, the time required to determine the physical servers as the destinations of the virtual server can be reduced.

Second Embodiment

Next, the virtual server system of a second exemplary embodiment will be described using the drawings.

Figure 5:
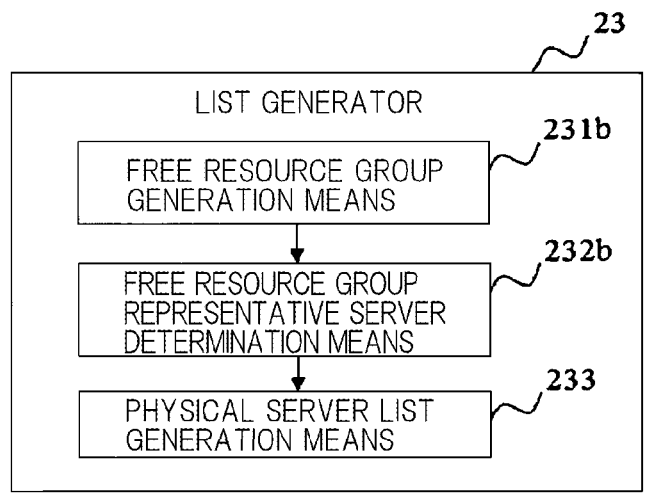
FIG. 5 is a block diagram showing a configuration of the list generator included in the autonomous control server of a second exemplary embodiment.
Figure 6:
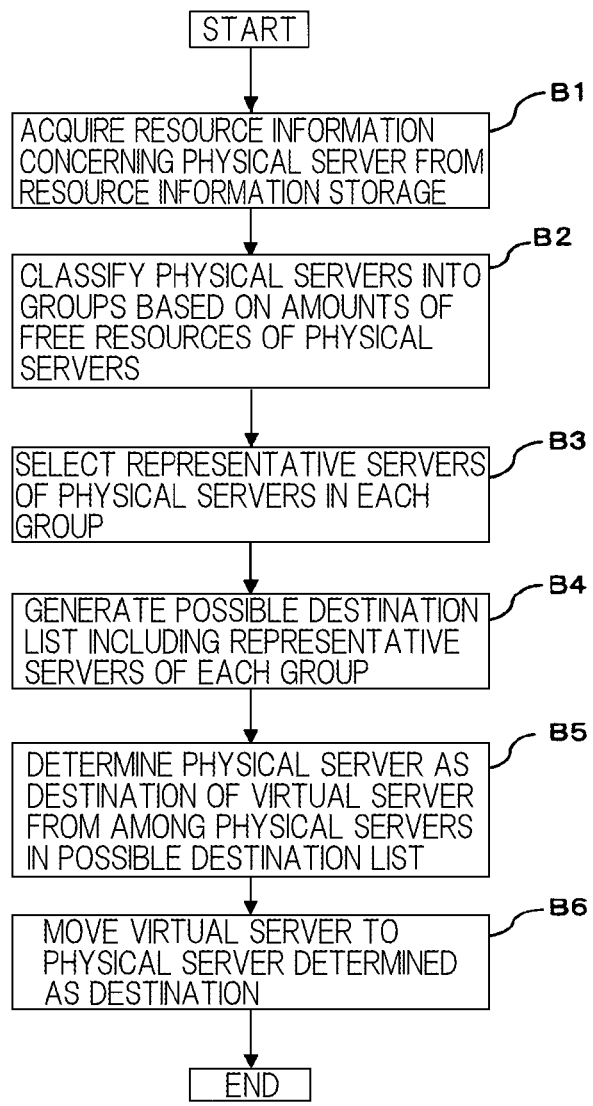
FIG. 6 is a flow chart showing a processing procedure of the autonomous control server included in the virtual server system of the second exemplary embodiment.

FIG. 5 is a block diagram showing a configuration of the list generator included in the autonomous control server of the second exemplary embodiment. FIG. 6 is a flow chart showing a processing procedure of the autonomous control server included in the virtual server system of the second exemplary embodiment.

The virtual server system of the second exemplary embodiment is an example of reducing the number of possible destinations by generating the possible destination list of the destinations of the virtual server based not on the load information of the physical servers, but on the amounts of free resources of the physical servers.

The configuration of the virtual server system is the same as the configuration shown in FIG. 1. It is assumed that in autonomous control server 2, resource information collector 21 has collected, as resource information of physical servers 31 to 3m and virtual servers 311 to 3mn, information of loads (utilizations of CPUs, memories, network I/Os, hard disk I/Os, and the like) of the physical servers and the virtual servers collected at every certain time interval and the maximum processing performances of physical servers 31 to 3m collected by preliminary measurement or by other methods (for example, measured in a process by benchmark software). It is assumed that the target virtual server is virtual server 311 that operates in physical server 31.

As shown in FIG. 5, the list generator of the second exemplary embodiment comprises free resource group generation means 231b and free resource group representative server determination means 232b in place of load group generation means 231a and load group representative server determination means 232a included in list generator 23 of the first exemplary embodiment shown in FIG. 3.

Free resource group generation means 231b acquires information of loads (utilizations of CPUs, memories, network I/Os, hard disk I/Os, and the like) and maximum processing performances of physical servers 31 to 3m from resource information storage 22, uses the values of the loads and the processing performances to calculate the amounts of free resources of physical server 31 to 3m, and classifies physical server 31 to 3m into groups based on the calculated amounts of free resources.

Free resource group representative server determination means 232b selects a predetermined number of physical servers as representative servers in each group generated by free resource group generation means 231b.

Physical server list generation means 233 generates a list of physical servers (possible destination list) including the representative servers of each group selected by free resource group representative server determination means 232b.

As shown in FIG. 6, in autonomous control server 2, free resource group generation means 231b of list generator 23 first acquires the information of the loads and the processing performances of physical servers 31 to 3m from resource information storage 22 (step B1).

When the information of the loads of physical servers 31 to 3m is acquired, free resource group generation means 231b classifies physical servers 32 to 3m into groups based on the amounts of free resources included in the information of the loads (step B2). At this point, physical server 31 as the origin of target virtual server 311 is excluded from the elements for the classification into groups.

The amounts of free resources of physical servers 32 to 3m, which depend not only on the utilizations of resources of physical servers 31 to 3m, but also on the processing performances of physical servers 31 to 3m, are calculated by the following formula.

$$R=(1-U/100)\times P$$

In the formula, R denotes the amount of free resources of a physical server, U denotes the utilization of resources of a physical server, and P denotes the maximum processing performance of a physical server. Free resource group generation means 231b may use the amounts of free resources of individual resources, such as CPUs and memories, to classify physical servers 32 to 3m into groups or may use values calculated based on the amounts of free resources of the resources to classify physical servers 32 to 3m into groups. Furthermore, free resource group generation means 231b may classify physical servers 32 to 3m into groups based on predetermined ranges of amounts of free resources, and other methods may be used to classify physical servers 32 to 3m into groups.

Next, in autonomous control server 2, free resource group representative server determination means 232b selects a predetermined number of physical servers as representative servers in each group. For example, free resource group representative server determination means 232b sorts the physical servers in a group in descending order of amounts of free resources and determines the top three physical servers that have greater amounts of free resources as the representative servers. Alternatively, free resource group representative server determination means 232b randomly selects physical servers (for example, two physical servers) from a group without sorting the physical servers and selects the physical servers as representative servers. Free resource group representative server determination means 232b may determine the representative servers of each group by other methods. At this point, the number of representative servers may be 0 as a result of the selection process (step B3).

Next, in autonomous control server 2, physical server list generation means 233 generates a possible destination list including the representative servers of each group (step B4).

Subsequently, in autonomous control server 2, destination determination unit 24 determines a physical server (for example, physical server 3m) as the destination of target virtual server 311 from among the physical servers as the possible destinations included in the possible destination list (step B5). The physical server as the destination of virtual server 311 can be determined using, for example, the method described in Non Patent Literature 1 (paragraphs 4.2 and 4.3) as described above.

Lastly, in autonomous control server 2, virtual server movement unit 25 moves target virtual server 311 to physical server 3m as the destination determined in step B5 by destination determination unit 24 (step B6).

According to the virtual server system of the exemplary embodiment, the number of physical servers as possible destinations of a virtual server can be reduced by classifying the physical servers into groups based on the amounts of free resources and by selecting a predetermined number of representative servers as possible destinations in each group. Therefore, the time required to determine the physical servers as the destinations during the movement of the virtual server can be reduced.

Third Exemplary Embodiment

Next, the virtual server system of a third exemplary embodiment will be described using the drawings.

Figure 7:
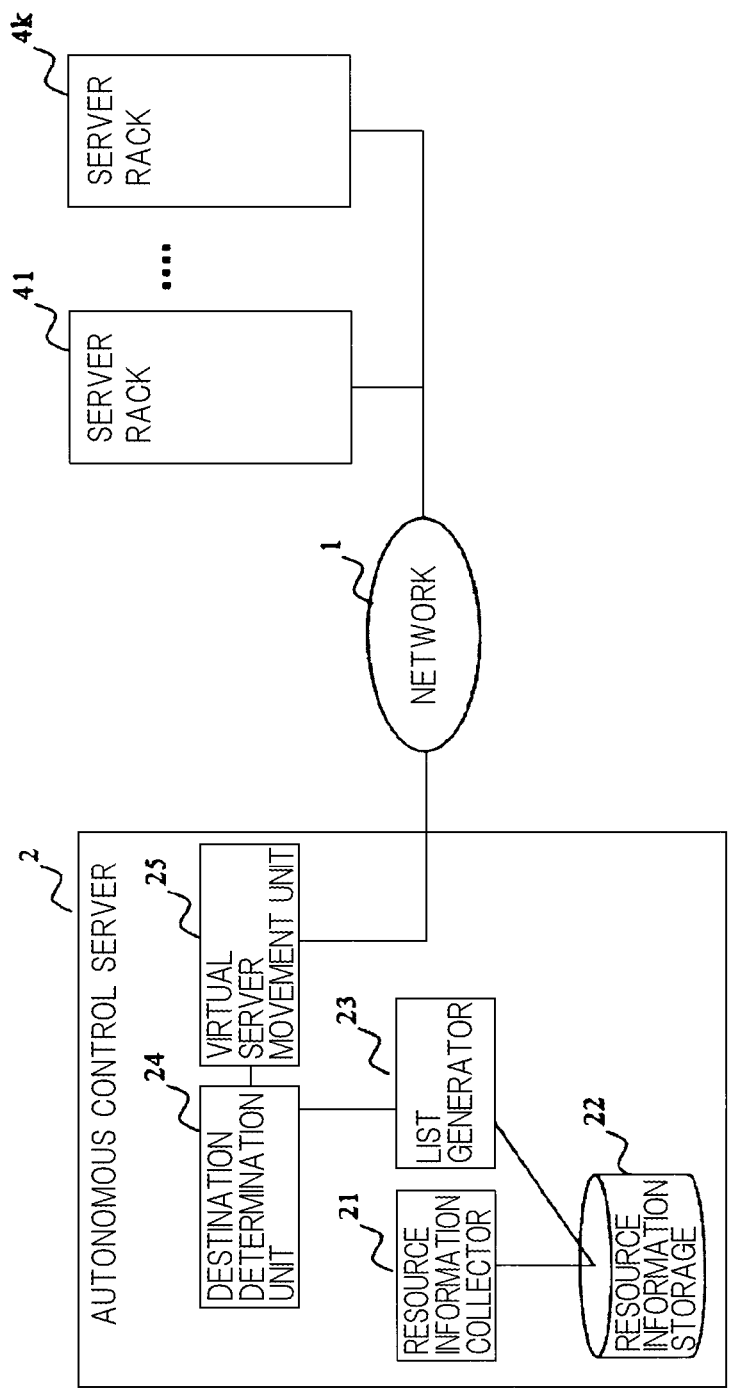
FIG. 7 is a block diagram showing a configuration of the virtual server system of a third exemplary embodiment.

As shown in FIG. 7, the virtual server system of the third exemplary embodiment comprises server racks 41 to 4k storing physical servers and autonomous control server 2 that manages virtual servers operated by the physical servers (not shown) stored in server racks 41 to 4k. Autonomous control server 2 and physical servers stored in server racks 41 to 4k are connected through communication network 1. The configuration of autonomous control server 2 is the same as that of the virtual server system shown in FIG. 1, except for list generator 23.

Figure 8:
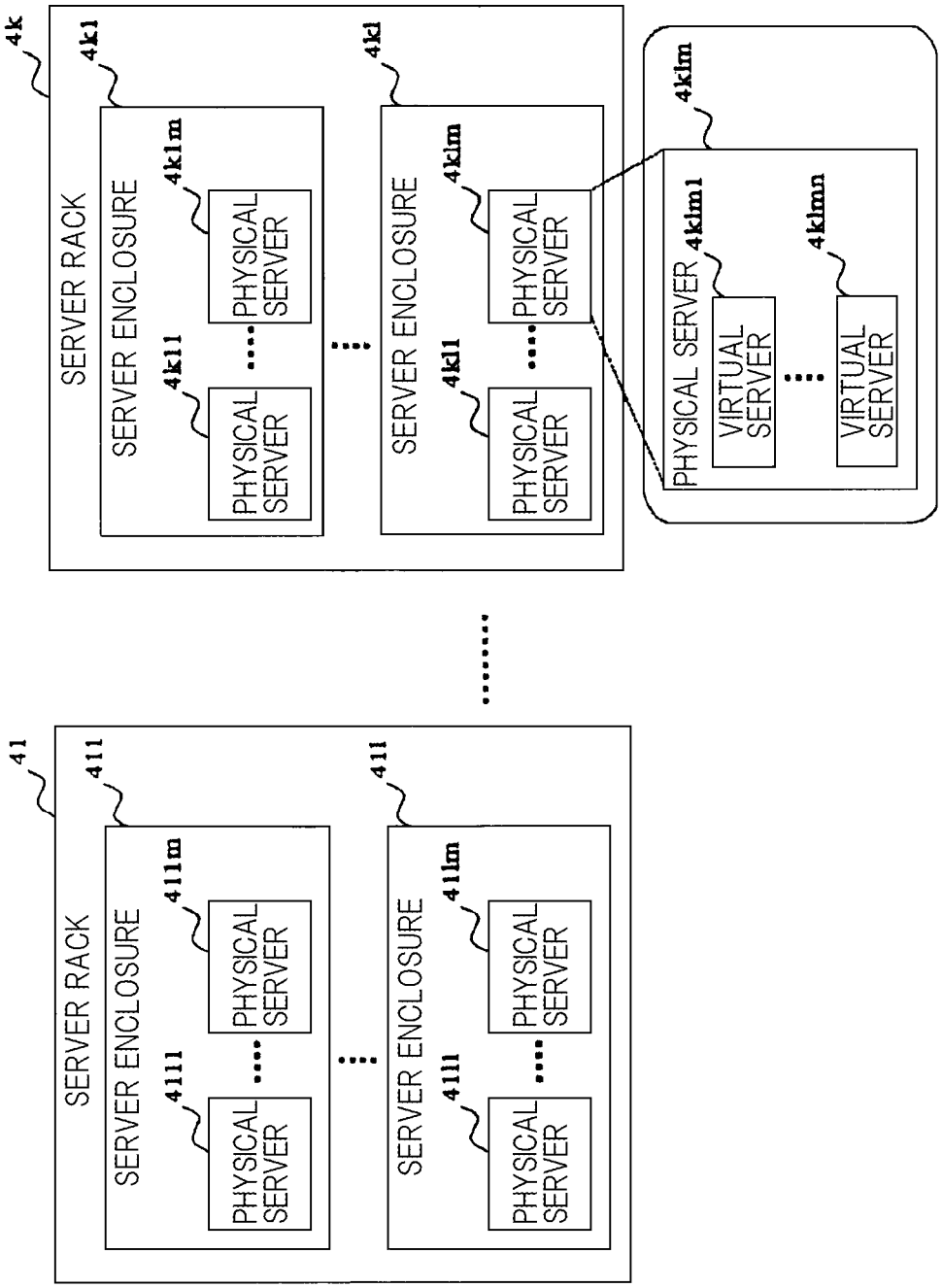
FIG. 8 is a block diagram showing a state of a physical server housed in a server rack shown in FIG. 7.

As shown in FIG. 8, each of server racks 41 to 4k comprises server enclosures, and each physical server stored in the server enclosures operates virtual servers. In FIG. 8, reference numerals 411 to 411 are provided to the server enclosures included in server rack 41, and reference numerals 4k1 to 4kl are provided to the server enclosures included in server rack 4k (k and l are positive integers). Furthermore, in FIG. 8, reference numerals 4111 to 411m are provided to the physical servers stored in server enclosure 411, reference numerals 4111 to 411m are provided to the physical servers stored in server enclosure 411, reference numerals 4k11 to 4k1m are provided to the physical servers stored in server enclosure 4k1, and reference numerals 4k11 to 4k1m are provided to the physical servers stored in server enclosure 4k1 (m is a positive integer). Furthermore, in FIG. 8, reference numerals 4k1m1 to 4k1mn are provided to the virtual servers operated by physical server 4k1m.

Physical servers 4111 to 4k1m comprise a known computer that executes processes in accordance with programs stored, for example, in a recording medium (such as a magnetic disk, a semiconductor memory, and an optical disk).

Figure 9:
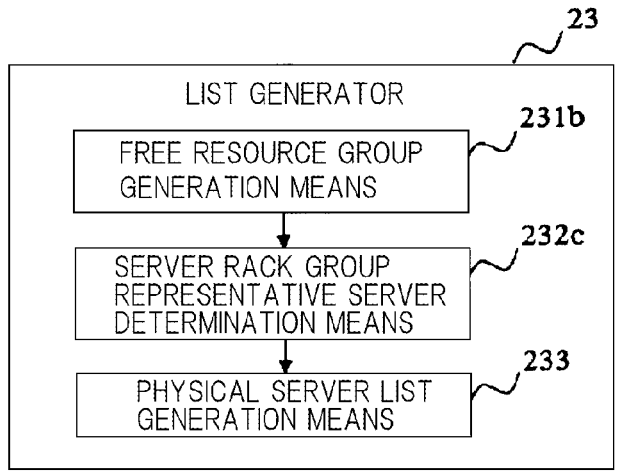
FIG. 9 is a block diagram showing a configuration of the list generator included in the autonomous control server of the third exemplary embodiment.

As shown in FIG. 9, list generator 23 of the third exemplary embodiment comprises free resource group generation means 231b, server rack group representative server determination means 232c, and physical server list generation means 233.

Free resource group generation means 231b acquires information of the loads (utilizations of CPUs, memories, network I/Os, hard disk I/Os, and the like) and the maximum processing performances of physical servers 31 to 3m from resource information storage 22, uses the values of the loads and the processing performances to calculate the amounts of free resources of physical servers 31 to 3m, and classifies physical servers 31 to 3m into groups based on the calculated amounts of free resources.

Server rack group representative server determination means 232c selects a predetermined number of physical servers as representative servers in each group generated by free resource group generation means 231b.

Physical server list generation means 233 generates a list of physical servers (possible destination list) including the representative servers of each group selected by free resource group representative server determination means 232b.

Figure 10:
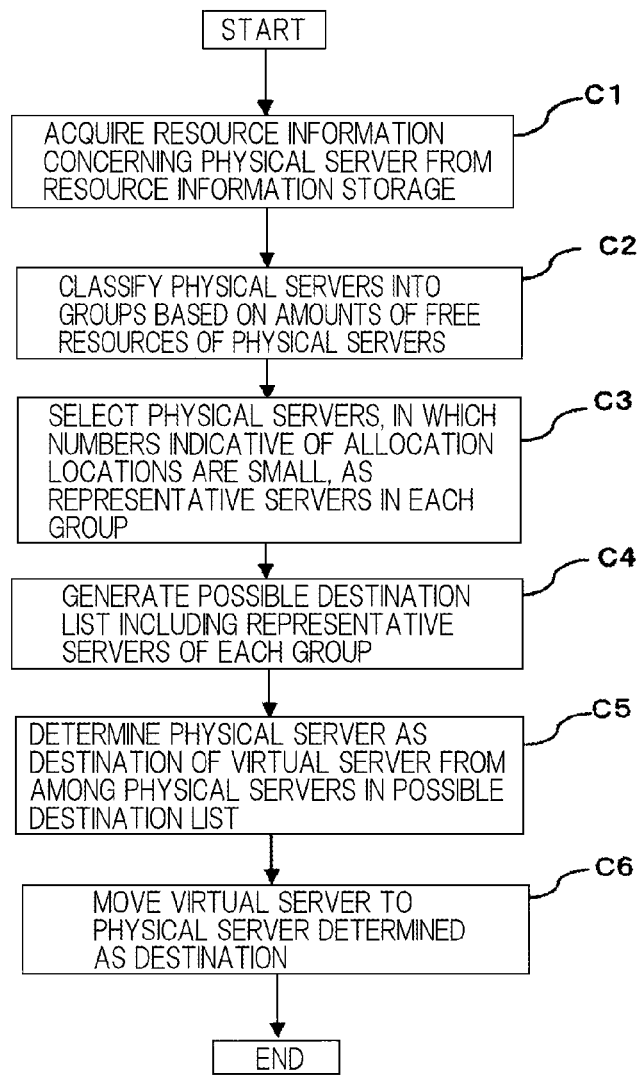
FIG. 10 is a flow chart showing a processing procedure of the autonomous control server included in the virtual server system of the third exemplary embodiment.

FIG. 10 is a flow chart showing a processing procedure of the autonomous control server included in the virtual server system of the third exemplary embodiment.

The virtual server system of the third exemplary embodiment is an example of grouping the physical servers based on the amounts of free resources and selecting physical servers (representative servers) as possible destinations of a virtual server based on the installation locations of the server racks.

It is assumed that in autonomous control server 2 of the third exemplary embodiment, resource information collector 21 has collected, as resource information of physical servers 4111 to 4k1m and virtual servers 41111 to 4k1mn, information of loads (utilizations of CPUs, memories, network I/Os, hard disk I/Os, and the like) of the physical servers and the virtual servers collected at every certain time interval and the maximum processing performances of physical servers 4111 to 4k1m collected by preliminary measurement or by other methods (for example, measured in a process by benchmark software).

The installation locations of the physical servers in server racks 41 to 4k are designated, for example, as follows.

K server racks are included, and the server racks include server enclosures of L levels. If the server enclosures can store M physical servers, the installation locations P of the physical server can be defined by the following coordinates.

$P(x,y,z)$ where $1 \leq x \leq K, 1 \leq y \leq L$, and $1 \leq z \leq M$.

It is assumed that the target virtual server is virtual server 44321 on physical server 4432 and that the installation location of physical server 4432 is P (4, 3, 2).

As shown in FIG. 10, in autonomous control server 2, free resource group generation means 231b of list generator 23 first acquires the information of the loads and the processing performances of physical servers 4111 to 4k1m from resource information storage 22 (step C1).

When the information of the loads of physical servers 4111 to 4k1m is acquired, free resource group generation means 231b classifies physical servers 4111 to 4k1m into groups based on the amounts of free resources included in the information of the loads (step C2). At this point, physical server 4432 as the origin of target virtual server 44321 is excluded from the elements for the classification into groups. The amounts of free resources of physical servers 4111 to 4k1m are calculated as in the second exemplary embodiment.

Free resource group generation means 231b may use the amounts of free resources of individual resources, such as CPUs and memories, to classify physical servers 4111 to 4k1m into groups or may use values calculated based on the amounts of free resources of the resources to classify physical servers 4111 to 4k1m into groups. Furthermore, free resource group generation means 231b may classify physical servers 4111 to 4k1m into groups based on predetermined ranges of the amounts of free resources, and other methods may be used to classify physical servers 4111 to 4k1m into groups.

Next, in autonomous control server 2, server rack group representative server determination means 232c selects a predetermined number of physical servers as representative servers in each group. For example, server rack group representative server determination means 232c sorts the physical servers in a group in ascending order of numbers of server racks storing the physical servers, numbers of server enclosures, and numbers of physical servers, in other words, in ascending order of x, y, and z of P (x, y, z), and selects representative servers from among the physical servers stored in the server racks with rack numbers smaller than the number of the server rack storing physical server 4432 as the origin. If there are no physical servers in the server racks with smaller numbers than server rack 44 storing physical server 4432 as the origin, physical servers stored in the server rack with the smallest rack number among the remaining physical servers can be selected as the representative servers. Server rack group representative server determination means 232c may use the number of the server enclosure including physical server 4432 as the origin or the numbers of the physical servers to select the representative servers by the same procedure as the selection procedure using the numbers of the server racks (step C3). A predetermined number of representative servers (for example, two) may be set as an upper limit of the number of representative servers selected in each group, as in other exemplary embodiments. The number of representative servers selected in each group may be 0 as a result of the selection process.

Next, in autonomous control server 2, physical server list generation means 233 generates a possible destination list including the representative servers of each group (step C4).

Subsequently, in autonomous control server 2, destination determination unit 24 determines a physical server (for example, physical server 4111) as the destination of target virtual server 44321 among the physical servers as the possible destinations included in the possible destination list (step C5). The physical server as the destination of virtual server 44321 can be determined using, for example, the method described in Non Patent Literature 1 (paragraphs 4.2 and 4.3) as described above.

Lastly, in autonomous control server 2, virtual server movement unit 25 moves target virtual server 44321 to physical server 4111 as the destination determined in step C5 by destination determination unit 24 (step C6).

Although an example of classifying the physical servers into groups based on the amounts of free resources has been illustrated in the exemplary embodiment, the physical servers may be classified into groups based on the loads of the physical servers as in the first exemplary embodiment.

According to the exemplary embodiment, the physical servers are classified into groups based on the amounts of free resources, and a predetermined number of representative servers are selected in each group based on the installation locations of the physical servers. As a result, as in the first exemplary embodiment and the second exemplary embodiment, the number of physical servers as the possible destinations of the virtual server can be reduced, and the time required to determine the physical servers as the destinations during the movement of the virtual server can be reduced.

Furthermore, for example, the resources of the physical servers can be aggregated by moving the virtual servers to physical servers with small numbers of server racks, server enclosures, and physical servers. Therefore, the locations (physical servers) where the virtual server operates can be reduced to a narrower range.

Therefore, the power of the server enclosures or the server racks storing physical servers with no operating virtual servers can be turned off, and the power consumption of the virtual server system can be reduced.

Although the present invention has been described with reference to the exemplary embodiments, the present invention is not limited to the exemplary embodiments. Various changes understandable by those skilled in the art can be made to the configurations and the details of the present invention within the scope of the present invention.

This application claims the benefit of priority based on JP2008-219871A filed Aug. 28, 2008, the entire disclosure of which is hereby incorporated by reference.

The invention claimed is:

1. A virtual server system comprising:
   a plurality of physical servers in which a plurality of virtual servers can be operated; and
   an autonomous control server that classifies said physical servers into a plurality of groups based on a predetermined index, selects a predetermined number of physical servers as representative servers in each group, determines a physical server as a destination of a target virtual server from among the representative servers of each group, and moves said target virtual server to the determined physical server as the destination.

2. The virtual server system according to claim 1, wherein said predetermined index is load information concerning said physical servers.

3. The virtual server system according to claim 1, wherein said predetermined index is information concerning the amounts of free resources of said physical servers.

4. The virtual server system according to claim 1, wherein said autonomous control server selects the representative servers of each group based on installation locations of said physical servers.

5. A non-transient recording medium having embodied thereon an autonomous control server comprising:
   a list generator that classifies a plurality of physical servers in which a plurality of virtual servers can operate in a plurality of groups based on a predetermined index, selects a predetermined number of physical servers as representative servers in each group, and generates a possible destination list that includes the representative servers of each group and that indicates the physical servers as possible destinations of a target virtual server;
   a destination determination unit that determines a physical server as a destination of said virtual server from said possible destination list; and
   a virtual server movement unit that moves the target virtual server to the physical server as the destination determined by said destination determination unit.

6. The recording medium according to claim 5, wherein said list generator classifies said physical servers into a plurality of groups based on loads of said physical servers.

7. The recording medium according to claim 5, wherein said list generator classifies said physical servers into a plurality of groups based on the amounts of free resources of said physical servers.

8. The recording medium according to claim 5, wherein said list generator selects the representative servers of each group based on installation locations of said physical servers.

9. A physical server selection method for selecting a physical server as a destination of a required virtual server from among a plurality of physical servers in which a plurality of virtual servers can operate, wherein
   a computer is configured to:
   classify said physical servers into a plurality of groups based on a predetermined index;
   select a predetermined number of physical servers as representative servers in each group;
   determine a physical server as a destination of a target virtual server from among the representative servers of each group; and
   move said target virtual server to the determined physical server as the destination.

10. The physical server selection method according to claim 9, wherein
    said predetermined index is load information concerning said physical servers.

11. The physical server selection method according to claim 9, wherein
    said predetermined index is information concerning the amounts of free resources of said physical servers.

12. The physical server selection method according to claim 9, wherein
    said representative servers of each group are selected based on installation locations of said physical servers.

13. The recording medium according to claim 6, wherein said list generator selects the representative servers of each group based on installation locations of said physical servers.

14. The recording medium according to claim 7, wherein said list generator selects the representative servers of each group based on installation locations of said physical servers.

15. The virtual server system according to claim 2, wherein the load information includes utilizations of CPUs, memories, network I/Os or hard disk I/Os.

16. The recording medium according to claim 6, wherein the loads include utilizations of CPUs, memories, network I/Os or hard disk I/Os.

17. The physical server selection method according to claim 10, wherein the load information includes utilizations of CPUs, memories, network I/Os or hard disk I/Os.

18. The virtual server system according to claim 1, wherein process performance of the physical servers is calculated according to:

$$R = (1 - U/100) \times P$$

where R denotes an amount of free resources of the physical server, U denotes utilization of resources of the physical server, and P denotes a maximum processing performance of the physical server.

19. The recording medium according to claim 5, wherein process performance of the physical servers is calculated according to:

$$R=(1-U/100)\times P$$

where R denotes an amount of free resources of the physical server, U denotes utilization of resources of the physical server, and P denotes a maximum processing performance of the physical server.

20. The physical server selection method according to claim 9, wherein process performance of the physical servers is calculated according to:

$$R=(1-U/100)\times P$$

where R denotes an amount of free resources of the physical server, U denotes utilization of resources of the physical server, and P denotes a maximum processing performance of the physical server.

* * * * *